Nov. 22, 1949  H. L. SMALL  2,489,110
ANTISKID CHAIN DEVICE
Filed May 21, 1948  2 Sheets-Sheet 1
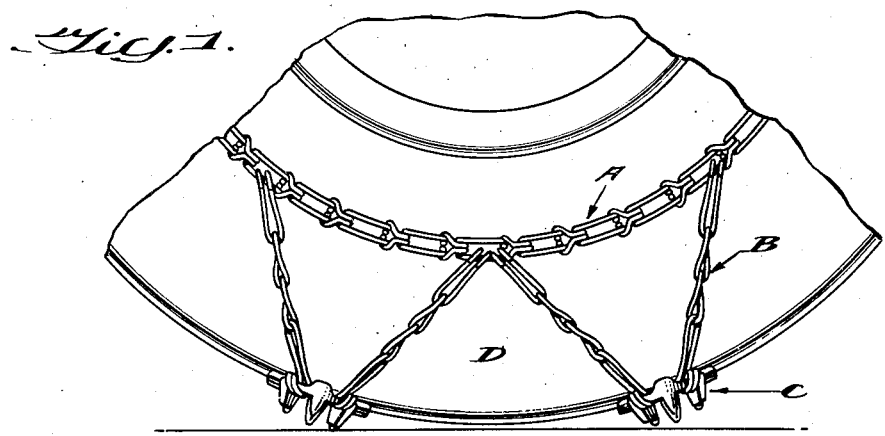
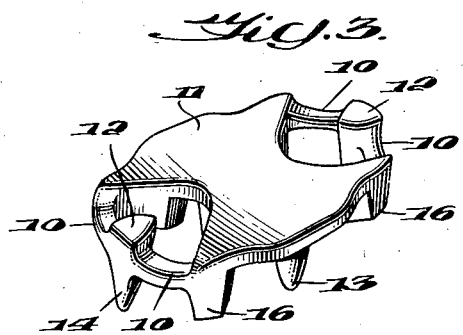
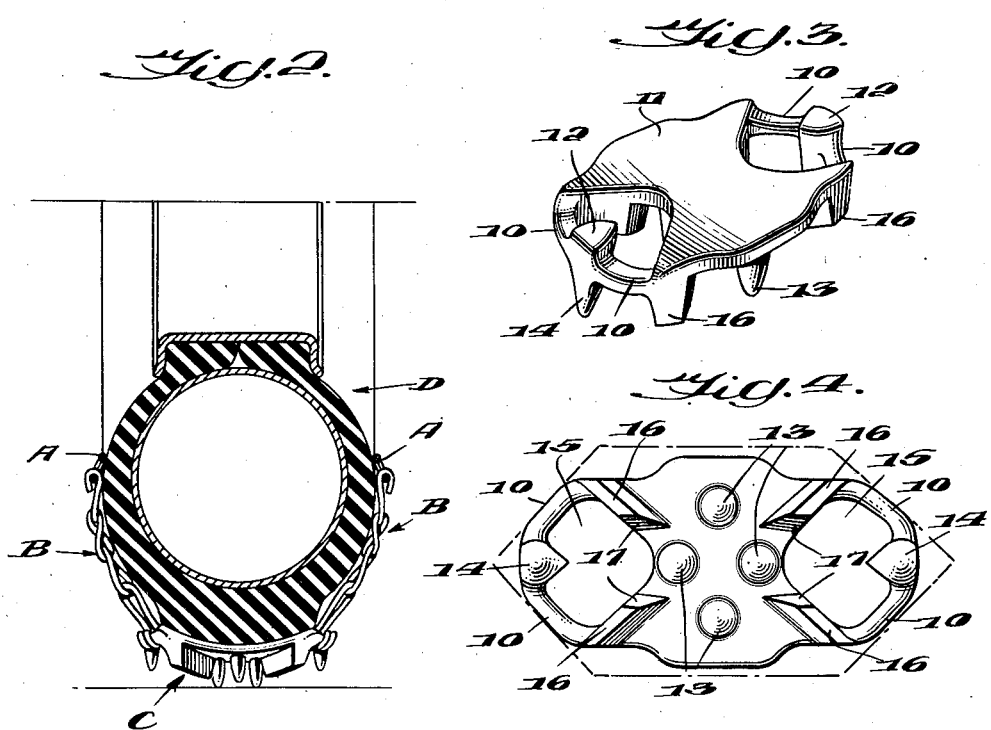
Inventor
HERBERT L. SMALL,
By Hall & Houghton
Attorneys Nov. 22, 1949 — H. L. SMALL — 2,489,110
ANTISKID CHAIN DEVICE
Filed May 21, 1948 — 2 Sheets-Sheet 2
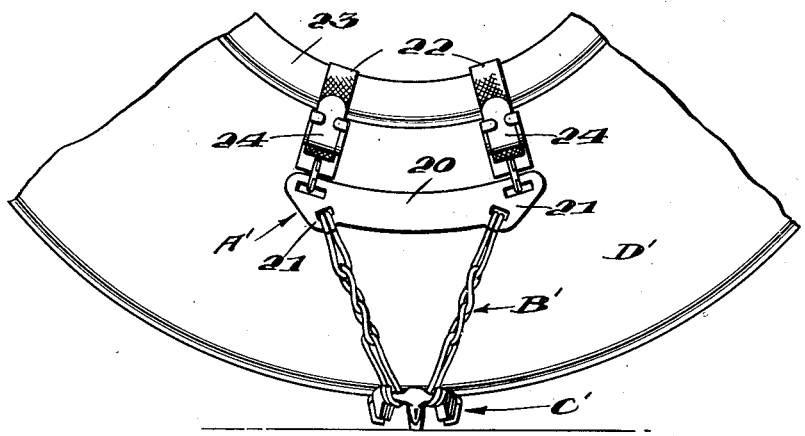
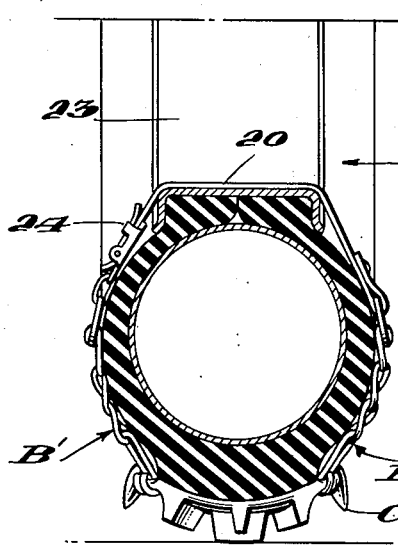
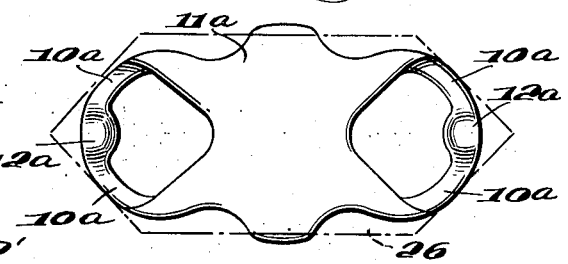
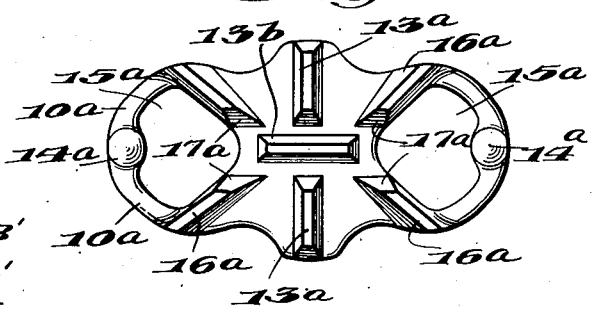
Inventor
HERBERT L. SMALL,
By Hall & Houghton
Attorneys Patented Nov. 22, 1949

2,489,110

UNITED STATES PATENT OFFICE 2,489,110

ANTISKID CHAIN DEVICE

Herbert L. Small, Auburn, Maine

Application May 21, 1948, Serial No. 28,399

7 Claims. (Cl. 152—230)

This invention relates to anti-skid chain devices and particularly to tire chains of the crown-plate type, and aims to provide an improved form of crown plate adapted to reduce wear of the tires and of the chain portions. It also aims to provide an improved association of the crown plate with the chain structure which insures against overturning of the crown plates during driving or stopping actions.

Other objects and advantages of the invention will be apparent from the following description of preferred embodiments thereof.

With the foregoing objects and advantages in mind the invention comprises the improved cross chain unit of the crown-plate type, the combination of such units in complete tire chains and emergency chain elements, and the improved structural features and combinations hereinafter described and claimed.

In the accompanying drawings of preferred embodiments of the invention,

Fig. 1 is a fragmentary side elevation showing one form of the invention;

Fig. 2 is a fragmentary cross-section through Fig. 1;

Fig. 3 is a perspective view of the back of the crown plate of Fig. 1;

Fig. 4 is a plan view of the working face of the crown plate;

Fig. 5 is a side elevation of a modified embodiment of the invention;

Fig. 6 is a cross-section through Fig. 5; and

Figs. 7 and 8 are plan views from back and front of the crown plate of Figs. 5 and 6.

In the illustrative embodiment shown in Figs. 1 to 4, the improved anti-skid chain comprises conventional side chains A to which are secured the anti-skid units comprising cross links B and crown plates C.

Each of the cross-link sections B in the preferred form is provided with hook ends of standard or other suitable form adapted to be secured to the links of the side chain A and to the corner bars 10 (Figs. 3 and 4) of the crown plate.

The crown plates C, in the forms shown, are preferably of a width transverse of the tire substantially greater than their length peripherally of the tire, and preferably are about equal in width to the width of the tread of the tire D. The back 11 of each crown plate C is generally concaved; i. e., the plate is outwardly convexed, preferably in both longitudinal and transverse directions, to conform generally to the longitudinal and transverse curvatures of a tire, and the corner bars 10 are separated by spacers or supporting elements 12 which serve the purpose of providing support for the bars 10a and preventing chafing of the chain-hooks against the tire. The corner and edges of the back surface 11 are preferably smoothly rounded as is best shown in Fig. 3.

The anti-skid face of the crown plate, as shown in Fig. 4, is provided with anti-skid calks 13, herein shown of stud-like form located in the central portion of the plate, and with lateral or apex calks 14 located in alignment with the supporting elements 12 at the apices between the corner bars 10. Adjacent the openings 15 through which the chain-hooks pass, and which also provide for dropping out of debris which might otherwise be trapped behind the plates, the preferred form of the invention is provided with diagonally positioned calks 16 preferably of cleat-like form.

It will be appreciated that the location of the cleats or lugs 16, and of the members 14, in juxtaposition to the openings 15, increases the effective height of these elements and thus provides a maximum traction grip in snow and mud. Also the diagonal positioning of the elements 16 and the inclination of their end faces 17 tends to compact the snow or mud with which these elements and the prongs 13 may be engaged and to obstruct free movement thereof which might reduce the attained traction.

In the form shown in Fig. 1 in which side chains A having relatively short links are employed as the cross-link supporting member, the cross link units B, C, may have their diagonally positioned chains B engage in every fourth link of the chain A. Where the chain A is formed of longer links these may bridge three links respectively, and the links of adjacent units B, C are preferably engaged in the same side link of chain A so as to space the crown plates relatively closely together.

In the form shown in Figs. 5 to 8, the elements A', B', C', D' correspond generally to the elements A, B, C, and D of Figs. 1-4, and the elements 10a, 11a, etc., correspond generally with the elements 10, 11, etc., in Figs. 1-4, except that in this form the studs 13 are replaced by longitudinal lugs 13a and a central transverse lug 13b, which affords a somewhat greater bite with icy surfaces. Furthermore, Fig. 5 shows the adaptation of the invention to the so-called emergency links in which the side members A' are constituted by arcuate side plates 20 having rectangular apertures 21 positioned diagonally to receive the end links of the diagonal cross chains B', and which have straps 22 adapted to pass around the wheel rim 23 and to be secured by suitable belt clamps 24. In the form shown the straps 22 and clamps 24 have lost motion connections to the arcuate side plates 21 which facilitate adjustment in certain cases.

As illustrated in both forms shown, and indicated by the dotted outline 26, Fig. 7, the crown plate of this invention is preferably generally hexagonal in outline and the calks 14, 14a are preferably arranged adjacent opposed apices thereof with the calks 13, 13a located centrally of the hexagon relative to these apices, and with the openings 15, 15a intervening between them. The provision of a common opening for both the corner bars at each apex and the isolation of the corner bars by elements 12, 12a and 14, 14a facilitates connection of the chain ends thereto and release of trapped detritus therefrom.

As above mentioned the outward flaring of the diagonally positioned cleat-like calks 16, 16a greatly improves the grip of the device. The spike-like members 14, 14a, being somewhat elevated, are saved from wear in the earlier part of the life of the crown plate but are fully available for deep traction, and come more and more into play as the gripping ability of the central calk elements is reduced by wear, thus aiding in maintaining the effectiveness of the crown plate throughout its life.

The invention is not limited to the particular arrangements described herein to exemplify the same, and is defined in the appended claims.

I claim as my invention:

1. An anti-skid device of the cross-chain and crown-plate type in which the crown plate is convexed to conform generally to the curvature of a tire surface, is provided with calks at its outer side and has a height from its back surface to the tips of its calks substantially greater than the depth of the closed end links of the cross chains, and in which the crown plate has corner bars, positioned intermediate its height between certain of said calks, about which the end links of said cross chains are closed, said calks thus protecting the plate engaging portions of said cross chains.

2. An anti-skid device comprising a generally hexagonal crown plate, calks adjacent two opposed apices of said plate, calks located in the central portion of said plate in spaced relation to said opposed apices, said calked plate having openings between said central portions and the portions thereof adjacent said opposed apices, said plate comprising chain-end receiving bars, edging portions of its sides adjacent said openings and said opposed apices and positioned intermediate the height of the plate in spaced relation to its tire-contacting surfaces so that the end-link portions of cross-chains engaged through said openings and closed about said bars are recessed into the back and front portions of said plate.

3. An anti-skid device according to claim 2 in which certain of the calks are located marginally of said openings.

4. An anti-skid device according to claim 3 in which certain of the calks located marginally of said openings are cleat-shaped and diagonally positioned in an outwardly flaring direction.

5. An anti-skid device according to claim 2 in which the calks located adjacent the two opposed apices of the plate are stud-shaped.

6. An anti-skid device of the side member, cross-chain and crown-plate type in which the crown plate is convexed to conform generally to the curvature of a tire surface, has a transverse width greater than its length, and is provided with diagonally positioned corner bars about which the end links of the cross chains are closed, in which the cross chains extend diagonally in leading and lagging directions from said corner bars to the cross-chain supporting side members of the device, said crown plate having at least one outwardly extending projection at the juncture of adjacent corner bars shielding the closed end links of the cross chains.

7. An anti-skid device comprising a generally hexagonal crown plate convexed to conform generally to the longitudinal and transverse curvature of a tire surface, calks adjacent two opposed apices of said plate, calks located in the central portion of said plate in spaced relation to said opposed apices, said calked plate having a height greater than that of a cross chain end-link and having openings between said central portions and the portions thereof adjacent said opposed apices, said plate comprising chain-end receiving bars edging portions of its sides adjacent said openings and said opposed apices and positioned intermediate the height of the plate in spaced relation to its tire-contacting surfaces so that the end-link portions of cross chains engaged through said openings and closed about said bars are recessed into the back and front portions of said plate.

HERBERT L. SMALL.

REFERENCES CITED

The following references are of record in the file of this patent:

UNITED STATES PATENTS

| Number | Name | Date |
| --- | --- | --- |
| 1,312,924 | Rowe | Aug. 12, 1919 |
| 1,626,788 | Crawford | May 3, 1927 |
| 2,280,555 | Sterner | Apr. 21, 1942 |